(12) United States Patent
Lee et al.

(10) Patent No.: US 9,886,315 B2
(45) Date of Patent: Feb. 6, 2018

(54) IDENTITY AND SEMAPHORE-BASED QUALITY OF SERVICE

(75) Inventors: Sangjin Lee, San Jose, CA (US); Debashis Saha, San Jose, CA (US)

(73) Assignee: eBay Inc., San Jose, CA (US)

( * ) Notice: Subject to any disclaimer, the term of this patent is extended or adjusted under 35 U.S.C. 154(b) by 1242 days.

(21) Appl. No.: 12/870,665

(22) Filed: Aug. 27, 2010

(65) Prior Publication Data

US 2012/0054765 A1   Mar. 1, 2012

(51) Int. Cl.
*G06F 9/50* (2006.01)

(52) U.S. Cl.
CPC .... *G06F 9/5027* (2013.01); *G06F 2209/5018* (2013.01)

(58) Field of Classification Search
None
See application file for complete search history.

(56) References Cited

U.S. PATENT DOCUMENTS

| | | | |
|---|---|---|---|
| 6,542,920 B1 * | 4/2003 | Belkin et al. | 718/104 |
| 6,895,584 B1 * | 5/2005 | Belkin | 718/100 |
| 7,913,257 B2 * | 3/2011 | Nishikawa | 718/102 |
| 2002/0013844 A1 * | 1/2002 | Garrett et al. | 709/225 |
| 2003/0093499 A1 * | 5/2003 | Messinger | G06F 9/5038 709/219 |
| 2003/0097584 A1 * | 5/2003 | Haukka et al. | 713/200 |
| 2004/0203459 A1 * | 10/2004 | Borras-Chia et al. | 455/67.13 |
| 2004/0203759 A1 * | 10/2004 | Shaw et al. | 455/433 |
| 2009/0183167 A1 * | 7/2009 | Kupferschmidt et al. | 718/104 |
| 2010/0153962 A1 * | 6/2010 | Tatu | 718/105 |
| 2010/0319051 A1 * | 12/2010 | Bafna | G06F 21/6218 726/1 |
| 2011/0321057 A1 * | 12/2011 | Mejdrich et al. | 718/105 |

* cited by examiner

*Primary Examiner* — Kenneth Tang
(74) *Attorney, Agent, or Firm* — Schwegman Lundberg & Woessner, P.A.

(57) ABSTRACT

Various embodiments described herein include at least one of systems, methods, and software for identity-based thread pool assignment. The identity may identify a source of a request where the source is a user, human or logical, or a network location where the request originated. Some embodiments include receiving a resource request via a network and classifying the resource request into a processing thread pool of a plurality of processing thread pools. The classifying may be based at least in part on an identifying characteristic of a source of the resource request. Each processing thread pool may have an assigned maximum number of processing threads available at any one time for processing resource requests. When a processing thread of the processing thread pool the request is classified into is available, some embodiments then assign the resource request to the available processing thread.

17 Claims, 5 Drawing Sheets

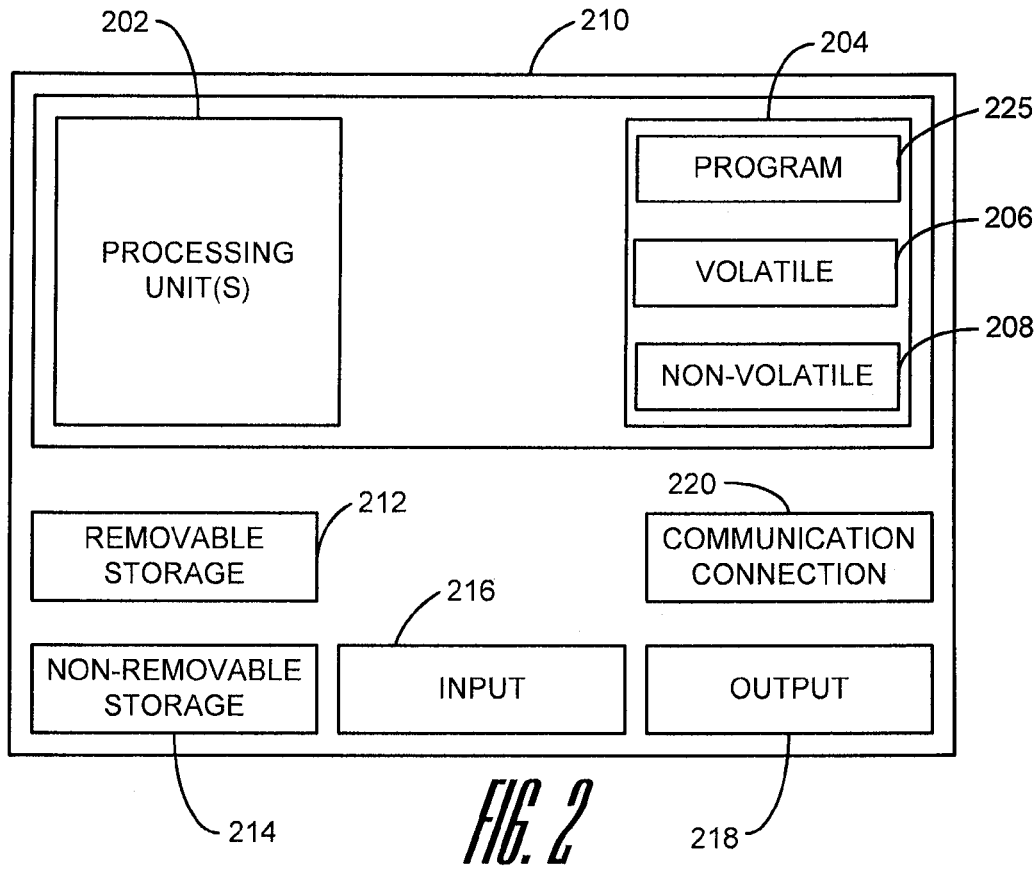

IDENTITY AND SEMAPHORE-BASED QUALITY OF SERVICE

BACKGROUND INFORMATION

In information processing, there are often a maximum possible number of processing threads active at any one time. Quality-of-Service (QoS) is a concept that is often employed to differentiate and isolate system processing loads and to manage information processing resources when a system is stressed. Current solutions typically differentiate and isolate system processing loads based on an information processing resource to be consumed by the processing threads. For example, conventional servlet containers typically have a single thread pool associated with handling requests for a particular resource. When a request is received for the particular resource, the servlet container simply determines if a thread of the single thread pool for the resource is available and assigns the request to a thread for processing when a thread is obtained.

BRIEF DESCRIPTION OF THE DRAWINGS

FIG. 2 is a block diagram of a computing device according to an example embodiment.

FIG. 3 illustrates a data structure storing thread pool assignment data, according to an example embodiment.

FIG. 4 illustrates a data structure storing thread pool assignment data, according to an example embodiment.

FIG. 5 illustrates a data structure storing thread pool thread assignment data, according to an example embodiment.

FIG. 6 illustrates a data structure storing thread pool assignment data, according to an example embodiment.

DETAILED DESCRIPTION

Figure 1:
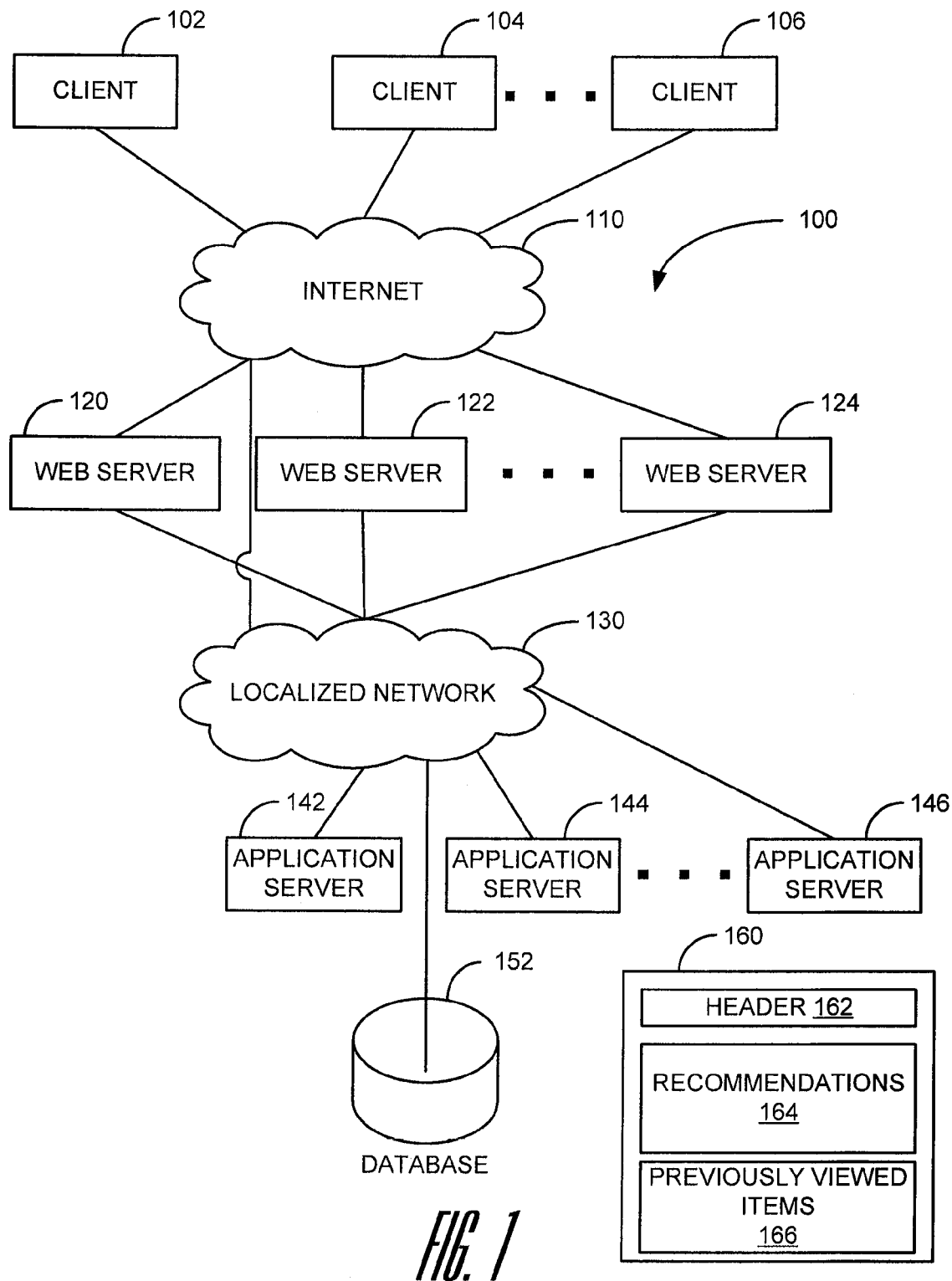
FIG. 1 is a logical block diagram of a computing environment, according to an example embodiment.

Various embodiments include at least one of systems, methods, and software that receive resource requests from a plurality of users, classify each resource request into one of a plurality of thread pools of the requested resource based on an identity of a user, human or logical, from which the request is received. However, the identity may also refer to a source from which the request is received, such as a Universal Resource Identifier (URI), an Internet Protocol (IP) address, a process identifier, a machine identifier, a network identifier, or other data indicative of a source. When a thread is obtained for the particular thread pool to which the resource request is classified, the resource request is processed. The plurality of thread pools may be implemented, for example, where a single, general-purpose thread pool exists thereby utilizing the single, general-purpose thread pool in a differentiated manner. Such embodiments provide for provisioning of different service level guarantees to different users, human or logical, and processing prioritization based on differing load types without a need to map different load types to particular network communication ports, paths, servers, or other resources, thereby eliminating context switching between primary and secondary thread pools and increasing overall system performance. Context switching is also not necessary in various embodiments described herein that include blocking resource requests until a processing thread becomes available as opposed to other solutions that place requests in queues that require off loading of processing to memory that maintains such queues until the request reaches the top of the queue. Some embodiments may be implemented within servlet containers, load balancing processes or devices, an application programming interface or kernel included on many or all computing environment resources, and other processes that receive resource requests from users, human or logical, and forward the received requests for further processing or data access.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a computing environment 100, according to an example embodiment. The computing environment 100 includes client computing devices 102, 104, 106 connected to the Internet 110, or other network. The client computing devices 102, 104, 106 may be one or more of various types of computing devices capable of communicating data over computer networks, such as the Internet 110. Some such devices include personal computers, laptop/notebook/netbook computers, handheld computers, smart phones, set top boxes, media playing devices (e.g., Blu-Ray players, MP3 players), hardware modules within automobiles, and the like. The client computing devices 102, 104, 106 are capable of requesting and receiving data over the Internet 110 from a web site, such as through a web server 120, 122, 124, and provide a view of the web site on a display of the respective client computing devices 102, 104, 106.

The web servers 120, 122, 124 may be physical and logical servers, or simply logical servers that execute on one or more physical computing devices. The web servers 120, 122, 124 operate to receive and respond to requests for data received over the Internet 110 or other network. The web servers 120, 122, 124 may provide web pages, such as web page 160, retrieved over a localized network 130, from one or more database 152, an application server 142, 144, 146, or other server or data storage location. In other embodiments, the web servers 120, 122, 124 and application servers 142, 144, 146 may provide the web page 160 or a portion thereof, such as a header 162, a recommendation portion 164 for a marketplace web page 160, data for a previously viewed items portion 166 of the web page 160, or other portions. In some embodiments, requests for data from the client computing devices 102, 104, 106 or other locations, processes, or devices may be received over the Internet 110 directly by one of the application servers 142, 144, 146. The application servers 142, 144, 146, as with the web servers 120, 122, 124, may be physical and logical servers, or simply logical servers that execute on one or more physical computing devices.

In some embodiments, each of the web servers 120, 122, 124, and the application servers 142, 144, 146, include an application kernel that provides web site functionality and web site management functionality for various purposes within the computing environment 100. The web site management functionality may provide functionality with regard to performance monitoring, load balancing, user activity tracking, ensuring Quality of Service (QoS), and the like. In some embodiments, the kernel also provides functionality to identify a thread pool a particular request is to be a placed in and to process the particular request accordingly. In some embodiments, the functionality of the application kernel is provided through an application programming interface (API) which is present in whole or in part on many, if not all, computing devices within the computing environment 100. In these and other embodiments, the web servers 120, 122, 124 and the application servers 142, 144, 146 may include a Java execution environment that services requests utilizing Java servlets. Execution of Java servlets is controlled by servlet containers. The servlet containers in such embodiments may include the functionality to identify a thread pool a particular request is to be a placed in and to process the particular request accordingly.

In some embodiments, when a request is received by a web server 120, 122, 124, an application server 142, 144, 146, or other computing or networking device within the computing environment 100, a process of the kernel or a servlet container classifies the request into a processing thread pool of a plurality of processing thread pools. The processing thread pools in such embodiments are virtual thread pools that partition a single thread pool, such as an actual thread pool available to a servlet container, into the plurality of thread pools that exist in memory. These virtual thread pools, in some embodiments, are utilized for prioritizing requests according to administrative settings. The classification of requests may be based, at least in part, on at least one identifying characteristic of received requests, such as a Globally Unique Identifier (GUID) included in a header or other portion of a request identifying a source of the request (i.e., a user, a group of users, a process, a computing device). The classification of a request into a thread pool may alternatively, or also, be based on a resource identified within a request. Such resources upon which a processing thread pool classification may be made include resources such as a web page 160, data within the database 152, a servlet, particular processes or other resources available on one of the web servers 120, 122, 124 or application servers 142, 144, 146, or other resources available within the computing environment 100. In these embodiments, each of the plurality of processing thread pools may have an assigned maximum number of processing threads available at any one time for processing requests. For example, the sum of the maximum number of threads available amongst all of the processing thread pools may not exceed a total number of processing threads available on a particular computing device, such as one of the application servers 142, 144, 146, or threads available to a servlet container.

When a request is classified into a particular thread pool but all permits for the class within the particular thread pool are in use and thus unavailable, further processing of the request is blocked until a permit becomes available and is provided to service the request. In some embodiments, the thread is blocked until either a permit becomes available or a timeout period expires. In some embodiments, a prioritization mechanism such as may be provided in a servlet container to provide processing threads to certain requests or to certain requestor in a prioritized manner.

In application server embodiments, conventional servlet containers, such as within the Apache Tomcat application server, typically have a single thread pool associated with handling requests. A single thread pool for handling disparate requests poses constraints in implementing quality of service (QoS) solutions. To overcome these constraints, some embodiments maintain a plurality of thread pools in memory of the application server under the control of a servlet container. The thread pools are maintained by at least one process of the servlet container in view of administrative settings such as may be stored in a memory device, the database 152, or elsewhere. As requests are received, the request is classified by the at least one process of the servlet container according to the administrative settings, which may include classification rules (i.e., user X request to pool A and user Y requests to pool B or all requests to pool C unless request is for resource Z). The administrative settings may also specify numbers of threads of a total number of available threads allocated to each thread pool. For example, the number of threads available to the kernel or servlet container may be 100 and there are two thread pools—A and B. Thread pool A may be allocated 70 threads and thread pool B may be allocated 30 threads. Thus, as the requests are received, the requests are classified into thread pool A or B and a counting semaphore for each thread pool may be maintained, for example, by the servlet container to track the number of utilized threads of each pool. When the count for thread pool A is at 70, subsequently received requests classified into thread pool A will be blocked as discussed above and the blocks released in due course upon the release of those threads or upon expiration of a timeout period when included in the particular embodiment. To determine if a thread is available and thereby allowing a request to be allocated a thread for execution, the counting semaphore for a particular thread pool may be queried and incremented utilizing an efficient compare-and-set (CAS) instruction. The CAS instruction only increments the counting semaphore of the particular thread pool when there is a thread available. Otherwise, the counting semaphore is not incremented until a permit becomes available, the request being blocked until that time. Through use of a CAS instruction, the number of instructions necessary to determine if a thread is available and to increment the counting semaphore is minimized, thereby increasing system performance.

Figure 7:
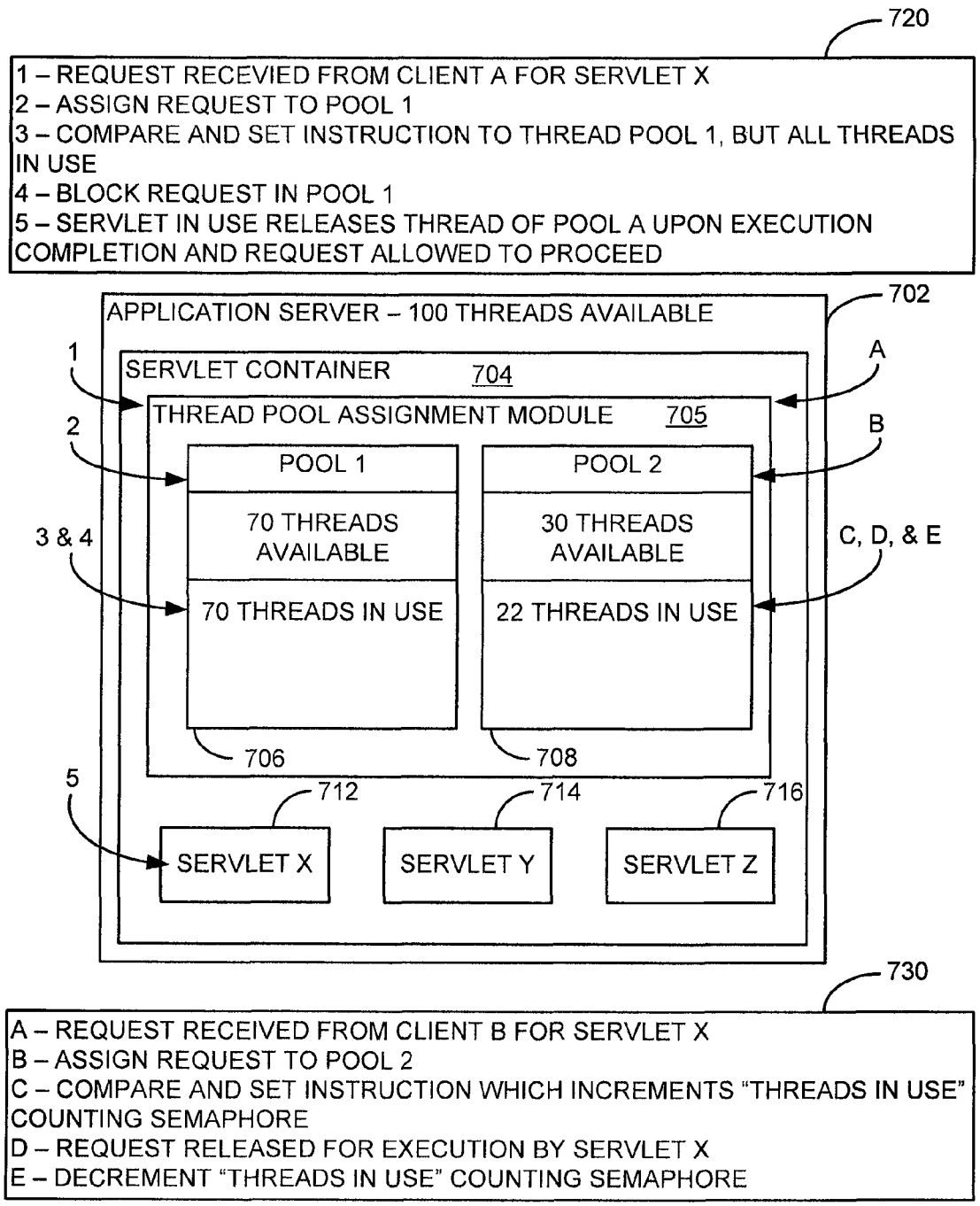
FIG. 7 is a block diagram of an application server including a servlet container and thread processing pools according to an example embodiment.

Although three web servers 120, 122, 124, three application servers 142, 144, 146, and one database 152 are illustrated in FIG. 1, any number of web servers 120, 122, 124, application servers 142, 144, 146, and database 152 may be present in the computing environment 100, depending on the requirements of the particular embodiment. Further, each of the application servers 142, 144, 146 may include one or more application servers executing on a single physical computing device, such as a physical server. Thus, the computing environment 100 of FIG. 1 is provided to illustrate an example computing environment architecture upon which some embodiments may be implemented. An example computing device upon which one or more the application servers 142, 144, 146, web servers 120, 122, 124, and database 152, may be implemented is illustrated in FIG. 7.

FIG. 2 is a block diagram of a computing device according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 210 may include at least one processing unit 202, memory 204, removable storage 212, and non-removable storage 214. Memory 204 may include volatile memory 206 and non-volatile memory 208. Computer 210 may include—or have access to a computing environment that includes—a variety of computer-readable storage media, such as volatile memory 206 and non-volatile memory 208, removable storage 212, and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input device 216, output device 218, and a communication connection 220, such as a network interface device. The computer 210 may operate in a networked environment using the communication connection to connect to one or more remote computers, such as database servers, application servers, web page servers, and other servers. The remote computer may include a personal computer (PC), server, router, network PC, a peer device or other common network node, or the like. The communication connection may include the Internet, a Local Area Network (LAN), a Wide Area Network (WAN) or other networks.

Computer-readable instructions tangibly stored on a computer-readable storage medium are executable by the at least one processing unit 202 of the computer 210. A hard drive, CD-ROM, and RAM are some examples of articles including a computer-readable storage medium. For example, a computer program 225 capable of execution by the at least one processing unit 202 to cause the computer 210 to perform one or more of the described and claimed methods herein may be stored on such as computer-readable storage medium. A computer-readable storage medium may also store a kernel module, servlet container, program 225, or other process that executes on the at least one processing unit 202 to provide thread pool identification and allocation services on the computer 210, as discussed above with regard to FIG. 1 and the other embodiments described herein.

The administrative settings designating how requests are to be differentiated and assigned to processing, thread pools, as discussed above, may take different forms depending on the particular embodiment and how the embodiment is to be implemented. For example, FIG. 3 illustrates a data structure 200 storing thread pool assignment data, according to an example embodiment. The thread pool assignment data differentiates between combinations of a client and requested servlet of a request. A client may be identified in a request through inclusion of a GUID, IP address, a Universal Resource Identifier (URI) such as a Universal Resource Locator (URL), process identifier, user identifier, or other identifying data of a requestor, human or logical, or location of the requestor from which the request is received.

FIG. 4 illustrates data structure 400 storing thread pool assignment data, according to another example embodiment. The thread pool assignment data of FIG. 4 is simpler than the data of the FIG. 3 example embodiment. The thread pool assignment data in the data structure 400 of FIG. 4 assigns requests to thread pools based exclusively on the requesting client. The requesting client may be a human user, a logical user such as a process or other servlet, or a particular computing device or computing device type.

FIG. 5 illustrates yet another data structure 500 storing thread pool thread assignment data, according to another example embodiment. The data structure 500 includes two tables 402, 404. The first table 402 includes data assigning clients to groups. The second table 404 assigns groups to pools. In this embodiment, within the first table 402, a client may be assigned to one group and many clients may be assigned to a particular group. Within the second table 404, a group may be assigned to only one pool, but a pool may have more than one assigned group.

Although not illustrated, another table may include conditional group assignments represented as rules. For example, client A may be assigned to pool 1 if the request is for a particular servlet, but if the request is not for the particular servlet, client A is assigned to pool 2.

Regardless of how the thread pool assignment administrative data is specified, when a request is received a thread pool assignment module will obtain the appropriate thread pool assignment administrative settings and assign the request to the proper thread pool. The thread pool assignment administrative data may be input by an administrator and stored, such as through a user interface 900 as illustrated and described below with regard to FIG. 8 and FIG. 9.

FIG. 6 illustrates a data structure 600 storing thread pool assignment data, according to an example embodiment. The thread pool assignment data structure 600 stores different data than illustrated and described above with regard to FIG. 3, FIG. 4, and FIG. 5. The thread pool assignment data structure 600 of FIG. 6 instead stores a number of threads allocated to each thread processing pool. In some embodiments, the total number of threads assignable to all of the groups is constrained by a number of threads available to a controlling process, such as an application server, servlet container, or kernel process. The thread pool assignment data structure 600 may be generated and modified through an administrative user interface such as is illustrated and described below with regard to FIG. 8 and FIG. 9.

FIG. 7 is a block diagram of an application server 702, such as one of the application servers 142, 144, 146 of FIG. 1, including a servlet container 704, a thread pool assignment module 705, and thread processing pools 706, 708 according to an example embodiment. The servlet container 704 controls execution of at least one servlet 712, such as servlets X 712, Y 714, and Z 716. The thread processing pools include pool 1 706 and pool 2 708. The thread processing pools are maintained in memory, in some embodiments, by the thread pool assignment module 705.

Thread processing pool 1 706 in this example embodiment is assigned 70 processing threads as illustrated and also as shown in the data structure 600 of FIG. 6. Thread processing pool 2 708 is assigned 30 processing threads as illustrated and as shown in the data structure 600 of FIG. 6. Thread processing pool 1 currently has all 70 processing threads in use while thread processing pool 2 has only 22 of the 30 processing threads in use. With this context in mind, processing of two example requests received by the servlet container 704 of application server 702 will next be described with reference to boxes 720 and 730.

A first example request is received at 1 in box 720 by the servlet container 704 and is routed first to the thread pool assignment module 705. The request is received from client A for servlet X 712. Utilizing the data structure 300 of FIG. 3, as may be retrieved into a memory by the thread pool assignment module 705, the thread pool assignment module 705 determines that the request is to be placed in thread processing pool 1 706 at reference number 2. The thread pool assignment module 705 may then issue a compare and set instruction at reference number 3 to obtain a processing thread for processing the request. However, the compare and set instruction is immediately unsuccessful in obtaining a processing thread because all 70 of the 70 processing thread allocated to thread processing pool 1 706 are in use. Thus, the compare and set instruction is blocked at reference number 4 until a permit becomes available. As servlets complete execution within the servlet container 704, threads are released and the threads in use semaphore is decremented. Upon decrementing of the semaphore and the compare and set instruction is block at reference number 4 is released by obtaining the requested permit at reference number 5.

In a second example, a second example request is received at A in box 730 by the servlet container 704 and is routed first to the thread pool assignment module 705. The request is received from client B for servlet X 712. Utilizing the data structure 300 of FIG. 3, as may be retrieved into a memory by the thread pool assignment module 705, the thread pool assignment module 705 determines that the request is to be placed in thread processing pool 2 708 at reference letter B. The thread pool assignment module 705 may then issue a compare and set instruction at reference letter C to obtain a processing thread for processing the request. The compare and set instruction is successful in obtaining a processing thread as only 22 of the 30 processing threads allocated to thread processing pool 2 708 are being utilized. The compare and set instruction causes the counting semaphore of the number of threads in use to be increase by one. As not all of the allocated processing threads of thread pool 2 are in use, the request will not be blocked. By obtaining the processing thread for the request, the request is released by the thread pool assignment module 705 at reference letter D for execution by servlet X 712 within the servlet container 704 upon the application server 702. Upon completion of servlet X 712 execution, the thread pool assignment module 705 or another process within the servlet container 704 decrements the semaphore counter at reference letter E.

Figure 8:
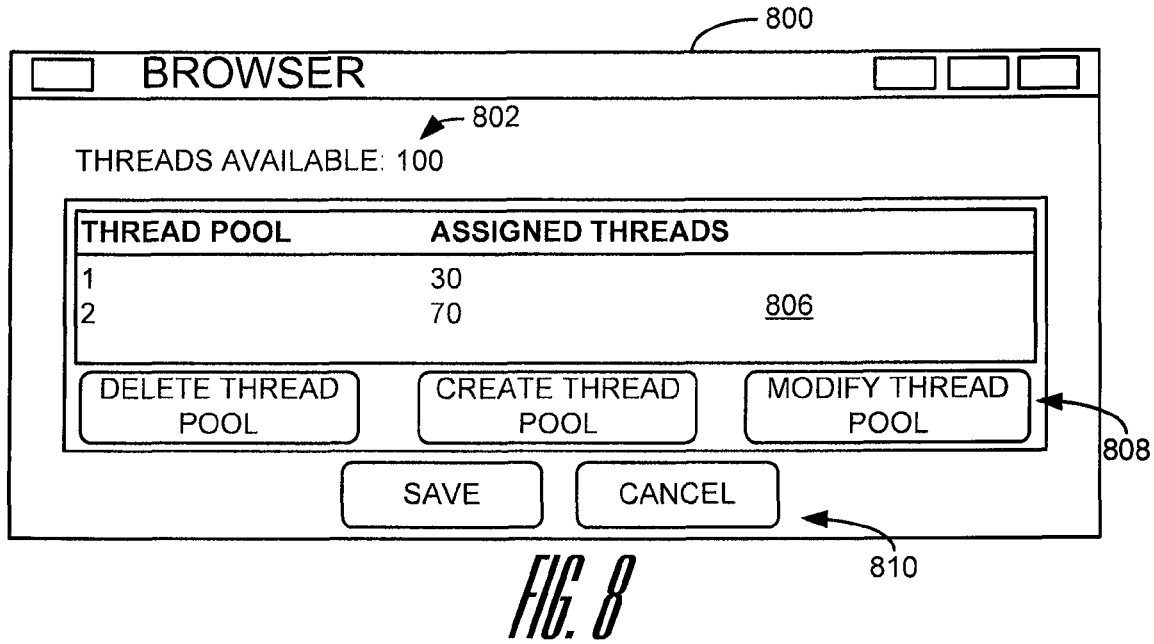
FIG. 8 illustrates a thread pool configuration user interface, according to an example embodiment.

FIG. 8 illustrates a thread pool configuration user interface 800, according to an example embodiment. The thread pool configuration user interface 800 is an administrative user interface that provides a view of configured thread pools and provides mechanisms through which thread pools may be created, modified, and deleted. The thread pool configuration user interface 800 includes a display of a number of threads available 802, a listing 806 of defined thread pools and details of assigned threads, a set of control buttons 808 which may be selected to create, modify, or delete defined thread pools, and a set of buttons 810 to save or cancel any changes made. Selection of the DELETE THREAD POOL control button causes one or more defined thread pools selected within the listing 806 to be removed from the listing 806. Selection of the MODIFY THREAD POOL control button causes a user interface 900 of FIG. 9 to be displayed populated with data of a selected thread pool selected within the listing 806. Selection of the CREATE THREAD POOL control button causes the user interface 900 of FIG. 9 to be displayed without any populated data.

Figure 9:
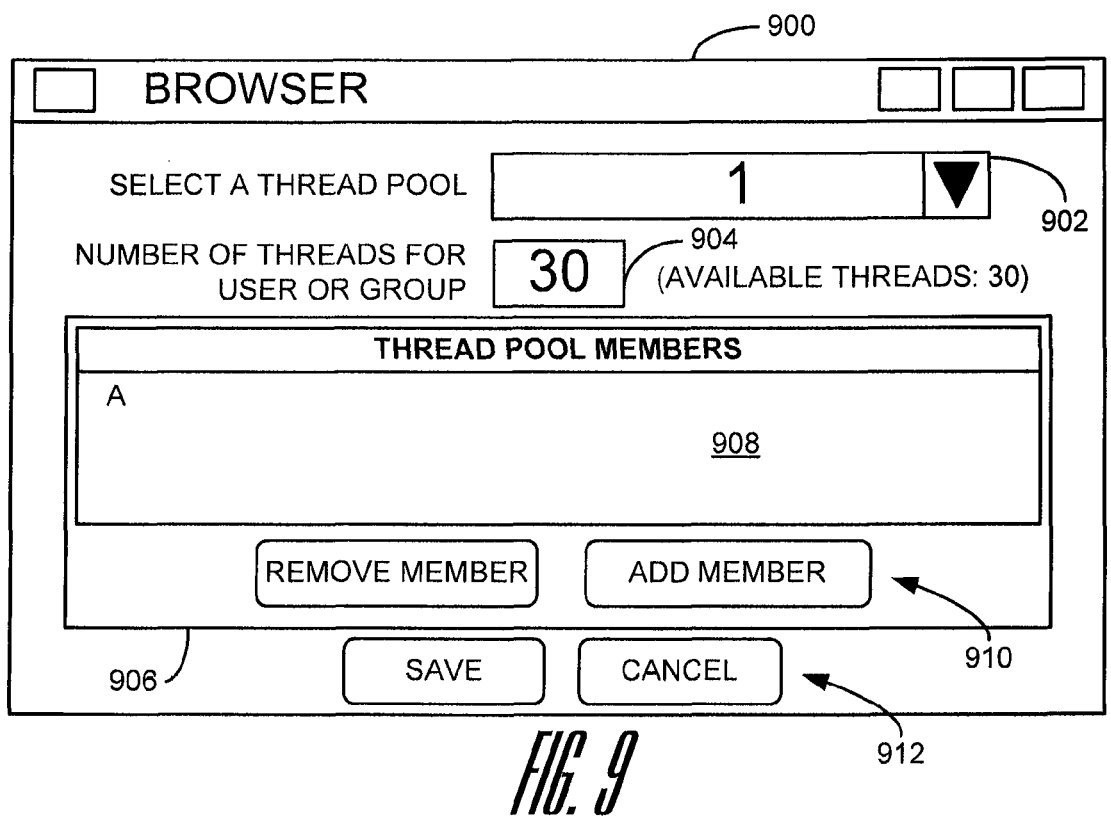
FIG. 9 illustrates a thread pool configuration user interface, according to an example embodiment.

FIG. 9 illustrates the thread pool configuration user interface 900, according to an example embodiment. The thread pool configuration user interface 900 may be opened, as mentioned above, populated with data of a thread pool selected within the listing 806 of FIG. 8. A user may modify a number of allocated threads in control 904, add or remove thread pool members within the listing 908 though selection of one of the control buttons 910, and save or cancel any changes made through selection of a control button 912. Through use of the drop down list box 902, a user may change a thread pool being edited or otherwise viewed within the thread pool configuration user interface 900. The thread pool configuration user interface 900 may also be opened without any populated data thereby allowing a user to define a new thread pool. In some embodiments, following a save or cancel action triggered through selection of one of the control buttons 912, the user may be returned to the thread pool configuration user interface 800 of FIG. 8. Although a user may select the save control button, the save action, in some embodiments causes any modified data of a thread pool to be populated back to the listing 806 of the thread pool configuration user interface 800 of FIG. 8. In such embodiments, upon saving modifications to the data in the listing 800 of FIG. 8, data rules may be applied to ensure data integrity, such as ensuring the number of assigned threads is less than or equal to the number of available threads 802.

Although FIG. 8 and FIG. 9 illustrate two user interfaces, these interfaces may be combined into a single user interface in some embodiments. Further, other functionality may be implemented in user interfaces for administration of the thread pools, differentiating how a number of threads are allocated amongst thread pools, and for other purposes associated therewith. Thus, the illustrated user interfaces are provided merely as examples and are not intended to limit the ways in which thread pools may be defined or how threads may be allocated and assigned for processing requests.

Figure 10:
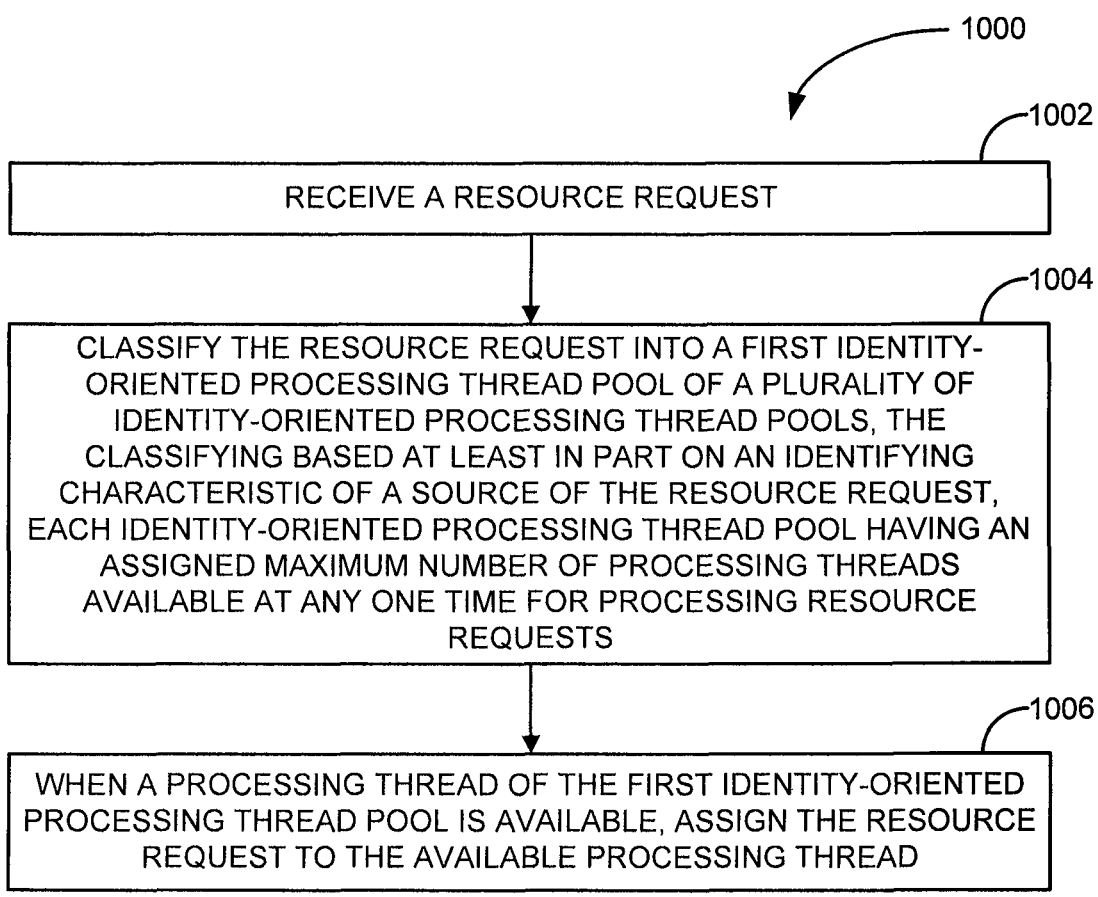
FIG. 10 is a flow diagram of a method according to an example embodiment.

FIG. 10 is a flow diagram of a method 1000 according to an example embodiment. The method 1000 of the example embodiment is a method for assigning resource requests, such as requests for Java servlets received by a Java servlet container, to a processing thread pool of a plurality of processing thread pools configured for utilizing threads available to the Java servlet container. In some embodiments, the method 1000 includes receiving 1002 a resource request. The resource request may be received 1002 over a network by a network interface device of a computer performing the method 1000. The method 1000 further includes classifying 1004 the resource request into a first identity-oriented processing thread pool of a plurality of identity-oriented processing thread pools. The classifying 1004 may be performed based at least in part on an identifying characteristic of a source of the resource request, such as a GUID or other data identifying either a user, human or logical, or other source included within the received 1002 request. Each identity-oriented processing thread pool includes an assigned maximum number of processing threads available at any one time for processing resource requests. Further, when a processing thread of the first identity-oriented processing thread pool is available, the method includes assigning 1006 the resource request to the available processing thread.

In some embodiments, when a processing thread of the first identity-oriented processing thread pool is not available, the method 1000 includes blocking the resource request until a processing thread of the first identity-oriented processing thread pool becomes available. In some such embodiments, the resource request is blocked until either a processing thread of the first identity-oriented processing thread pool becomes available or until a timeout period passes.

In some embodiments, the resource request may be further classified 1004 according to a resource requested, such as a particular servlet, other process, data item, database, or other resource that may be requested.

Another embodiment is takes the form of a system. In such embodiments, the system, such as computer 210 of FIG. 1, includes at least one computer processor, at least one memory device, and a network interface device. The at least one memory may store various instructions sets, executable by the at least one processor to cause the system to perform various tasks. For example, a first instruction set stored in the at least one memory device defines defining a container object that executes on the at least one computer processor to manage servlets and servlet data processing requests received via the network interface device. A second instruction set stored in the at least one memory device and executable by the at least one computer processor extends functionality of the container object in managing the servlet data processing requests received via the network interface device. The second instruction set executable by the at least one processor to cause the system to receive, via the network interface device, a servlet data processing request. The second instruction set is further executable by the at least one processor to classify the servlet data processing request into a first identity-oriented processing thread pool of a plurality of identity-oriented processing thread pools. This classifying may be based at least in part on an identifying characteristic of a source of the servlet data processing request. The identity-oriented processing thread pool typically has an assigned maximum number of processing threads available at any one time for processing servlet data processing requests on the at least one computer processor. The second instruction set is further executable by the at least one computer processor, when a processing thread of the first identity-oriented processing thread pool is available, to assign the servlet data processing request to the available processing thread of the first identity-oriented processing thread pool.

In some embodiments of the system, when assigning the servlet data processing request to the available processing thread of the first identity-oriented processing thread pool, the second instruction set increments, in the at least one memory device, a thread counter of a number of threads of the first identity-oriented processing thread pool being utilized. Upon processing completion of the servlet data processing request within the assigned thread, the second set of instructions is further executable by the at least one processor to decrement the thread counter of the number of threads of the first identity-oriented processing thread pool being utilized.

Some embodiments of such systems include a third instruction set stored in the at least one memory device and executable by the at least one processor to perform additional tasks. For example, such tasks may include receiving input to define an identity-oriented thread pool. This defining input may include input assigning a maximum number of threads available within the identity-oriented thread pool and storing the received input in the at least one memory device to be available to the second instruction set.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:
1. A computerized method comprising:
receiving, via a network interface device, a resource request;
identifying, based on data included in the resource request, a client associated with the resource request;
determining, based on data stored in a first table, a client group associated with the client;
classifying, by executing instructions on at least one computer processor, the resource request into a first processing virtual thread pool of a plurality of processing virtual thread pools, the classifying based at least in part on the client group and a specific resource requested by the resource request, wherein the first processing virtual pool is associated with more than one client group;
maintaining, by a servlet container, a counting semaphore for each of the plurality of processing thread pools to track a number of threads utilized by each respective processing thread pool;
determining, based on a counting semaphore for the first processing thread pool, a number of processing threads in the first processing virtual thread pool that are in use;

determining that the number of processing threads in the first processing virtual thread pool that are in use matches a maximum number of available processing threads for the first processing virtual thread pool;

while the number or processing threads in the first processing virtual thread pool that are in use matches the maximum number of available processing threads for the first processing virtual thread pool, blocking the resource request;

subsequently determining that the number or processing threads in the first processing virtual thread pool is below the maximum number of available processing threads for the first processing virtual thread pool;

in response to determining that the number or processing threads in the first processing virtual thread pool is below the maximum number of available processing threads for the first processing virtual thread pool, assigning the resource request to an available processing thread in the first processing thread pool;

incrementing the number of processing threads in the first processing virtual thread pool that are in use;

receiving a modify pool request; and in response to receiving the modify pool request, increasing the maximum number of available processing threads for the first processing virtual thread pool and decreasing a maximum number of available processing threads for a second processing virtual thread pool.

2. The computerized method of claim 1, wherein when a processing thread of the first processing virtual thread pool is not available, the resource request is blocked until a processing thread of the first processing virtual thread pool becomes available.

3. The computerized method of claim 2, wherein the resource request is blocked until either a processing thread of the first processing virtual thread pool becomes available or until a timeout period passes.

4. The computerized method of claim 1, wherein the source of the resource request is represented in the resource request with data including a Globally Unique Identifier (GUID) of the user that submitted the resource request.

5. The computerized method of claim 4, wherein the GUID identifies a logical user.

6. The computerized method of claim 1, wherein the resource request is further subject to a resource-oriented thread pool of the specific resource requested by the resource request.

7. The computerized method of claim 1, wherein the maximum number of available processing threads of the plurality of processing virtual thread pools is defined in configuration data stored in a memory device.

8. The computerized method of claim 7, wherein at least one of the plurality of processing virtual thread pools defined in the configuration data stored in the memory device includes at least one resource request classifying rule.

9. A system comprising:
one or more computer processors; and
one or more computer-readable mediums storing instructions that, when executed by the one or more computer processors, cause the system to perform operations comprising:
receiving, via a network interface device, a resource request;
identifying, based on data included in the resource request, a client associated with the resource request;
determining, based on data stored in a first table, a client group associated with the client;
classifying, by executing instructions on at least one computer processor, the resource request into a first processing virtual thread pool of a plurality of processing virtual thread pools, the classifying based at least in part on the client group and a specific resource requested by the resource request, wherein the first processing virtual pool is associated with more than one client group;
maintaining, by a servlet container, a counting semaphore for each of the plurality of processing thread pools to track a number of threads utilized by each respective processing thread pool;
determining, based on a counting semaphore for the first processing thread pool, a number of processing threads in the first processing virtual thread pool that are in use;
determining that the number of processing threads in the first processing virtual thread pool that are in use matches a maximum number of available processing threads for the first processing virtual thread pool;
while the number or processing threads in the first processing virtual thread pool that are in use matches the maximum number of available processing threads for the first processing virtual thread pool, blocking the resource request;
subsequently determining that the number or processing threads in the first processing virtual thread pool is below the maximum number of available processing threads for the first processing virtual thread pool;
in response to determining that the number or processing threads in the first processing virtual thread pool is below the maximum number of available processing threads for the first processing virtual thread pool, assigning the resource request to an available processing thread in the first processing thread pool;
incrementing the number of processing threads in the first processing virtual thread pool that are in use;
receiving a modify pool request; and
in response to receiving the modify pool request, increasing the maximum number of available processing threads for the first processing virtual thread pool and decreasing a maximum number of available processing threads for a second processing virtual thread pool.

10. The system of claim 9, wherein the source of the resource request is represented in the resource request with data including a Globally Unique Identifier (GUID) of the user that submitted the resource request, the GUID identifying a logical user.

11. The system of claim 9, wherein the resource request is further subject to a resource-oriented thread pool of the specific resource requested by the resource request.

12. The system of claim 9, wherein the maximum number of available processing threads of the plurality of processing virtual thread pools is defined in configuration data stored in a memory device.

13. The system of claim 12, wherein at least one of the plurality of processing virtual thread pools defined in the configuration data stored in the memory device includes at least one resource request classifying rule.

14. A non-transitory computer-readable medium storing instructions that, when executed by one or more computer processors of a computing device, cause the computing device to perform operations comprising:
receiving, via a network interface device, a resource request;

identifying, based on data included in the resource request, a client associated with the resource request;

determining, based on data stored in a first table, a client group associated with the client;

classifying, by executing instructions on at least one computer processor, the resource request into a first processing virtual thread pool of a plurality of processing virtual thread pools, the classifying based at least in part on the client group and a specific resource requested by the resource request, wherein the first processing virtual pool is associated with more than one client group;

maintaining, by a servlet container, a counting semaphore for each of the plurality of processing thread pools to track a number of threads utilized by each respective processing thread pool;

determining, based on a counting semaphore for the first processing thread pool, a number of processing threads in the first processing virtual thread pool that are in use;

determining that the number of processing threads in the first processing virtual thread pool that are in use matches a maximum number of available processing threads for the first processing virtual thread pool;

while the number or processing threads in the first processing virtual thread pool that are in use matches the maximum number of available processing threads for the first processing virtual thread pool, blocking the resource request;

subsequently determining that the number or processing threads in the first processing virtual thread pool is below the maximum number of available processing threads for the first processing virtual thread pool;

in response to determining that the number or processing threads in the first processing virtual thread pool is below the maximum number of available processing threads for the first processing virtual thread pool, assigning the resource request to an available processing thread in the first processing thread pool;

incrementing the number of processing threads in the first processing virtual thread pool that are in use;

receiving a modify pool request; and in response to receiving the modify pool request, increasing the maximum number of available processing threads for the first processing virtual thread pool and decreasing a maximum number of available processing threads for a second processing virtual thread pool.

15. The non-transitory computer-readable medium of claim 14, wherein the source of the resource request is represented in the resource request with data including a Globally Unique Identifier (GUID) of the user that submitted the resource request, the GUID identifying a logical user.

16. The non-transitory computer-readable medium of claim 14, wherein the resource request is further subject to a resource-oriented thread pool of the specific resource requested by the resource request.

17. The non-transitory computer-readable medium of claim 14, wherein the maximum number of available processing threads of the plurality of processing virtual thread pools is defined in configuration data stored in a memory device, at least one of the plurality of processing virtual thread pools defined in the configuration data stored in the memory device including at least one resource request classifying rule.

* * * * *